United States Patent [19]

Burton

[11] 3,812,487

[45] May 21, 1974

[54] MONITORING AND DISPLAY APPARATUS

[75] Inventor: Christopher Philip Burton, Alderley Edge, England

[73] Assignee: International Computers Limited, London, England

[22] Filed: Feb. 17, 1972

[21] Appl. No.: 227,209

[30] Foreign Application Priority Data

Feb. 17, 1971 Great Britain ...................... 4802/71

[52] U.S. Cl.... 340/324 AD, 178/7.5 D, 179/15 AL, 179/15 BM, 340/183, 340/413

[51] Int. Cl. ............................................ G08b 5/36

[58] Field of Search............. 340/324 AD, 183, 413; 178/7.3 D, 7.5 D; 179/15 AL, 15 BM

[56] References Cited

UNITED STATES PATENTS 2,987,715 6/1961 Jones et al. .................. 340/324 AD 3,573,787 4/1971 Sandgren et al. ............ 340/324 AD

*Primary Examiner*—David L. Trafton

*Attorney, Agent, or Firm*—Keith Misegades

[57] ABSTRACT

Apparatus is described for displaying, on a display device having a number of spatially separated indicating positions such as a television monitor screen or a matrix of display lamps, the states of a number of elements, each elemental state being primarily indicated by signals applied over one of a number of indicating lines.

The lines are connected to display converter modules which are arranged to scan the lines in sequence to produce a composite output signal which is applied to the display device. Where the number of lines is large, the serialisation of the line states may be done in stages, the first stage being the derivation of a separate composite signal from each of a number of groups of lines. The second stage then consists of deriving a final output signal by scanning the first-stage composite signals in turn.

The disclosure also deals with the use of similar converter modules for performing both the first stage and the second stage scans. It is also shown that the timing and synchronising signals needed to control the scanning and the distribution of the output signals to the display device may also be provided by similar converter modules.

4 Claims, 4 Drawing Figures

MONITORING AND DISPLAY APPARATUS

CROSS REFERENCE TO RELATED APPLICATION

Co-pending Patent Application Ser. No. 227,208, filed 17th Feb. 1972 and assigned to the same assignee, deals with the structure of the converter modules in greater detail.

BACKGROUND OF THE INVENTION

Field of the Invention

The invention relates to signal monitoring and display apparatus.

Description of the Prior Art

Data processors frequently use display lights for monitoring the states of signals at various positions within the machine. Disadvantages arise from feeding such signals in parallel to individual display lights. It is wasteful to utilize high bandwidth connections for low bandwidth signals involved. Also, extra connectors may be required together with very large multi-pin plugs and sockets if portable display panels are envisaged.

SUMMARY

According to the invention signal monitoring and display apparatus includes a plurality of element lines respectively carrying signals representative of the current states of elements to be monitored; a display device having a plurality of spatially separated index positions arranged in groups, the element lines being grouped to correspond to the grouping of the index positions; a source of timing signals arranged to produce first timing signals at a first frequency and second timing signals at a second frequency, the second frequency being a submultiple of said first frequency; control means including first display converter means for each separate group of element lines arranged to scan the element lines of its associated group in response to the first timing signals to produce on a group output line a group output signal having a succession of elemental components respectively representing the states of the elements of the associated line group and second display converter means arranged to scan the group output lines in turn in response to said second timing signals to produce on a data output line a data signal containing the elemental components arranged in order from each of the groups in succession; and means for applying said data output signal and said timing signals to the display device to distribute the elemental components respectively each to the different ones of the index positions in order of the groups of index positions in succession to provide a visual representation of the individual states of the elements.

The display converter means preferably includes converter modules, each module having a plurality of gating arrangements each with an input line, and a scanning means responsive to timing signals to scan the gating arrangements in turn. This scanning operation is arranged to present output signals derived from the gating arrangements in succession on an output line. In the case of the first display converter means the converter module or modules are arranged with the element lines respectively connected to the gating arrangements and the scanning means is driven by timing signals at the first frequency. In the case of the second display converter means the, or each, module has its gating arrangements connected to output lines from the first converter means modules and its scanning means is driven by timing signals at the second frequency.

The timing signal source may also include one or more similar modules and in this case a pulse train generater provides pulses at the first frequency to drive the scanning means while the gating arrangement inputs are arranged to enable only selected ones of the gating arrangements so that the output from the module or modules consists of a train of pulses at the second frequency.

Thus the arrangement described can be realised using a converter circuit module that is standardised and, if desired, produced in integrated circuit form. Such a circuit module is described and claimed in United States Patent Application Ser. No. 227,208 and has a total number of terminals that exceeds the number of signal monitoring inputs (first inputs to the AND gates) by four, namely, one for input to the first shift register stage, one for output from the last shift register stage, the shift terminal for application of shifting pulses, and the monitor output terminal for the outputs from the AND gates.

Conveniently, the data output signal constitutes at least a portion of a video signal for a television monitor, the monitor acting as the display device. In this case the first frequency is conventiently arranged to have a frequency in dependence upon the spatial separation required between adjacent index positions for a given line repetition rate. The second frequency then has a frequency dependent upon the required line separation.

Thus, line and frame scan systems can easily be obtained if the monitor output signals of several such converters or arrangements which may constitue lines of a video signal, are fed to the AND gate first inputs of at least one other converter. To provide adequate line separation the second repetition rate should be very much less than $1/n$ of the first repetition rate so that a space of several lines duration will follow each simultaneous operation of the several converters or arrangements. The said other converter then has its shift register operable at the (low) second repetition rate to propagate a said predetermined state set in the first shift register stage at a convenient line repetition rate for the video signal.

It is usually convenient for the low repetition rate to be a submultiple of the line frequency. Then, an arrangement for providing suitable third signals can use one or more of the above converters. Preset signal conditions are applied to the AND gate first inputs and first shift register operation is by signals at line rate. If more than one converter is required, each after the first is driven by the last shift register stage output of the preceding converter. Setting of the first shift register stage to the predetermined state is by feeding the monitor output back to the first shift register stage input preferably via an inverter.

A converter circuit module is thus a very useful and versatile building block.

In another application of the invention, the AND gate second input terminals are connected together to receive said second signals simultaneously and be enabled thereby at said second repetition rate, the output terminals of the AND gates each being connected to a different one of the shift register stages to set that stage to a state indicative of the corresponding signal to be monitored, thereby providing said monitor output signal from the final shift register stage output.

Embodiments of the invention have particular application to large scale integrated arrays of circuits where access to an array is restricted by the availability of only a limited number of connections.

BRIEF DESCRIPTION OF THE DRAWINGS

Preferred embodiments of the invention will now be described, by way of example, with reference to the drawings in which.

DESCRIPTION OF THE PREFERRED EMBODIMENTS

Figure 1:
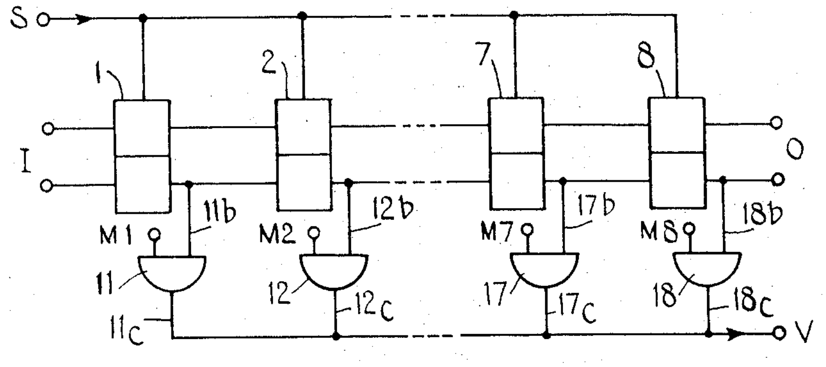
FIG. 1 shows, schematically, a first type of parallel-to-serial converter.

In FIG. 1, a shift register has a plurality of stages 1 to 8. Only stages 1, 2, 7 and 8 are shown, intermediate ones being implied by broken lines. Eight stages are indicated as it is preferred, though not essential, to utilize circuit modules each suitable for monitoring eight signals. These signals are connected via monitor input terminals M1 to M8 to first inputs of AND gates 11 to 18, respectively.

The AND gates have second input terminals 11*b* to 18*b* connected to transfer leads of the shift register stages 1 to 8, respectively each of which leads goes high for a predetermined state of the corresponding stage.

Terminals I and O constitute a state-determining input to the first shift register stage 1 and a state-representative output from the last shift register stage 8, respectively. Generally the stage configuration and external logic requirements are such that one-line terminals are sufficient. A terminal S serves for shift pulses at a first repetition rate and is coupled to each of the shift register stage 1 to 8 to cause shift register propagate operation from left to right in FIG. 1. In practice, additional circuits may be used to increase the driving capability of the shift pulses.

AND gate output terminals 11*c* to 18*c* are connected together to a common monitor output terminal V. This is more convenient in most applications than using an OR gate.

In operation, all of the shift register stages 1 to 8 are initially in their state differing from the predetermined state. A pulse is applied, via I, to set the first stage 1 to the predetermined state. On the next shift, the predetermined state is removed from terminal I and the second input terminal 11*b* of the AND gate 11 goes high so enabling the signal to be monitored to appear at the monitor output terminal V via AND gate output 11*c*.

In response to subsequent pulses at the shift terminal S, the predetermined state is propagated through the shift register stages in turn, causing successive enabling of the AND gates 12 to 18, and serial appearance at the monitor output terminal V of signal components representing the signals to be monitored via terminals M2 to M8.

Figure 2:
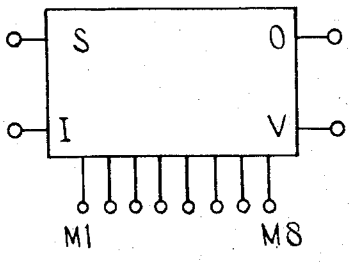
FIG. 2 shows, symbolically, the type of converter shown in FIG. 1.

FIG. 2 shows a convenient block representation of a converter circuit of FIG. 1. In using this block, intermediate monitor signal terminals M2 and M7 will sometimes be indicated by dashes between the end monitor signal terminals M1 to M8.

Figure 3:
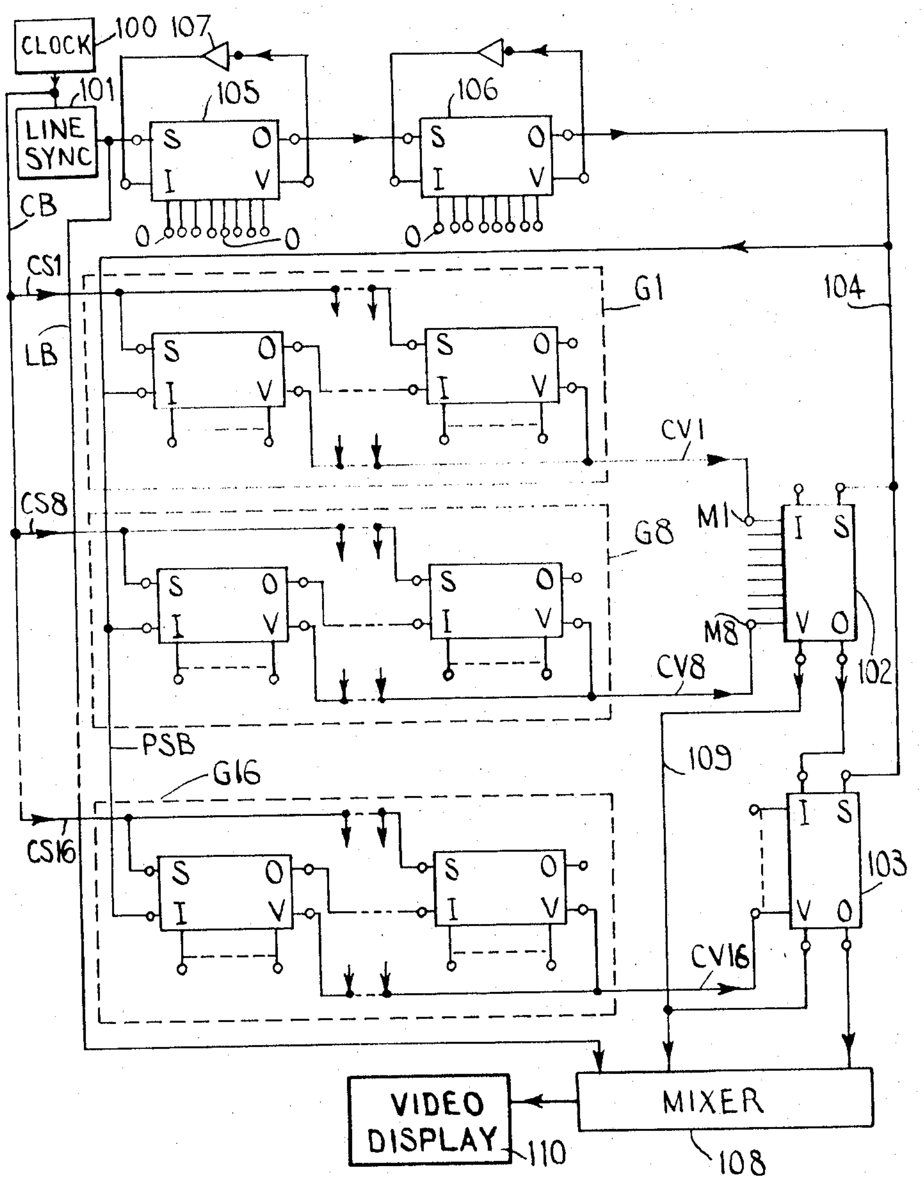
FIG. 3 shows, schematically, an arrangement including a plurality of converters each similar to that of FIG. 1 for providing line and frame scan type serial output signals.

FIG. 3 shows, schematically, part of a system for providing serial representations from 16 groups each of 32 signals to be monitored. As will be seen, each group will provide 32 signal components together making up one line of a 16-lines per frame video signal.

Each of these groups utilizes an arrangement, one of G1 to G16, of four converters each similar to that of FIG. 1. Only the arrangements G1, G8 and G16 are shown and, for each of these, blocks are shown only for the first and fourth converters. Each of the arrangements G1 to G16 has a single line, CS1 to CS16, connecting the shift pulse terminals S of all the converters thereof to a clock bus CB. Each arrangement G1 to G16 also has a single output line, CV1 to CV16, to which the monitor output terminals V of all the converters thereof are connected.

Within each group, the converters are connected in series, with the last stage output O of each converter connected to the first stage input I of the next converter. The first stage input of the first converter of each arrangement is connected to a pulse signal bus PSB. As will be described for line 104, the pulses on line PSB are at a submultiple, 1/32, of the repetition rate of pulses from bus LB, which rate is not more than 1/32 the repetition rate of clock pulses on bus CB. Thus, the predetermined state set in the first stage of the first converter of any one of the arrangements G1 to G16, will be propagated through the shift register stages of all four converters thereof before the next pulse appears on the bus LB. During that time, monitor components will appear serially on the lines CV1 to CV16 from all of the thirty-two signals to be monitored by each arrangement G1 to G16. Clearly several pulses in fact 31, will appear on bus LB before another pulse appears on line PSB to initiate the predetermined states again.

The clock bus CB is conveniently supplied by a free running pulse source 100 have a repetition rate of about 330 KHz, say giving a one microsecond pulse every three microseconds. The signal bus LB is conveniently fed by a free running source 101 of 10 KHz pulses, say of 3 microseconds duration every 100 microseconds, and corresponds with a line sync generator for the ultimate video signal. The source 101 will be locked in by any pulse from source 100.

The monitor signals of the arrangements G1 to G16 appearing in parallel on lines CV1 to CV16 are converted to serial form using a further two series connected converters 102 and 103 each of the type shown in FIG. 1. Lines CV1 to CV8 are connected to the monitor input terminals M1 to M8, respectively, of converter 102. Lines CV9 to CV16 are similarly connected to converter 103.

Both of the converters 102, 103 have their shift terminals S connected to line 104. A predetermined state which enables output from monitor output terminals V of converters 102 and 103 is therefore propagated from stage to stage with an interval determined by pulses on line 104. In order to separately show the series of signal elements from successive ones of the lines CV1 to CV16 on a conventional television monitor, it is convenient for the pulses on line 104 to be separated by 32 times the interval between the pulses from the generator 101. On one standard monitor, this gives a spacing of about one-half inch between lines of displayed data. If the beam is defocussed to give a blob of about a quarter of an inch diameter and the beam current increased, a very satisfactory, bright display results.

It would, of course, be desirable to align a mask with the monitor screen to aid identification of the signals represented by the various possible light spot positions. Possibilities for doing this include using fixed grid-reference lines and co-ordinates marked on a system logic diagram, fixed or interchangable film masks, or back projection systems for masks or logic diagrams. The latter two possibilities are specially suited to uses involving several arrays of FIG. 3. Alternatively appropriate further video signals may be multiplexed in.

The pulse signals desired for line 104 can be derived from the output of generator 101 using two converters 105, 106 of FIG. 1. The first of these, 105, has its shift pulse input S connected to the output of generator 101 to propagate between shift register stages at the rate of that pulse output. The first stage input terminal I is connected to the monitor output terminal V via an inverter 107. The monitor signal inputs of converter 105 are permanently energised by predetermined signals. In FIG. 3, the first and fifth monitor terminals are indicated by a zero and have a signal thereat that is the inverse of what would be required to set a shift register stage of the converter 105 to the predetermined state. All other monitor terminals are complementarily energised with reference to the shift register state they would induce. The result is that converter 105 will provide at last stage shift register output O for every fourth one of the pulses from generator 101.

The last stage output of converter 105 is connected to the shift pulse terminal S of the converter 106. The converter is connected as for converter 105 but with only its first monitor terminal energised as for the zero references above. The result is that the last stage shift register output O of converter 106 will appear once for every thirty-two of the output pulses of generator 101.

The ultimate serial output signals from terminals V of converters 102 and 103 are taken to mixer 108 via line 109. The mixer 108 also received pulses from the bus LB which it combines with the signals on line 109 as line sync signals of a composite video signal for which the frame sync signal is derived from the last stage shift register output of the converter 103. The latter may also be fed back to the first stage input I for converter 102.

If RF modulation is provided for, several network arrays of the FIG. 3 type may have their output available alternatively by using a channel selector. Only a single line connection would be required for each FIG. 3 array.

Figure 4:
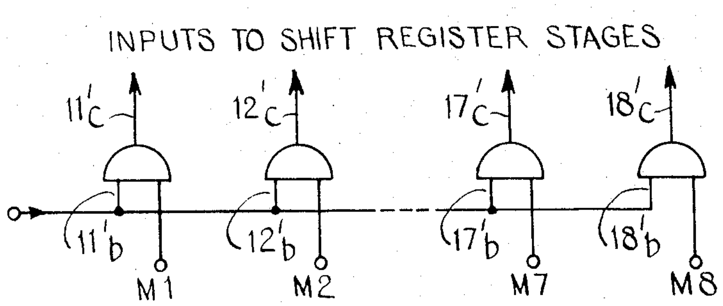
FIG. 4 shows, schematically, part of a second type of parallel-to-serial converter.

Another type of basic converter results from a modification of the FIG. 1 circuit by connecting the AND gate outputs, 11'*c* to 18'*c* in FIG. 4, to determine states of corresponding shift register stages when the AND gate second inputs, 11'*b* to 18'*b* in FIG. 4 are simultaneously energised. The AND gate second inputs are connected to a common line for this purpose. The result is that the states of the shift register stages represent monitored signal conditions at the time of energising the AND gate second inputs.

Arrangements of series connected converters of this other type will handle more signals to be monitored on a simultaneous or "snapshot" basis by connecting all the second AND gate inputs together. If the overall shift register of such an arrangement is made re-entrant (i.e. its last stage output fed back to its first stage) a "snapshot" may be stored for continuous display.

Clearly, parallel networks of such converters and arrangements are also realisable in a manner similar to FIG. 3 for the first type of converter. "Snapshot" storage capabilities would be unaffected.

Slow scanning for feeding signals out for transmission e.g., over the telephone network could be provided. It may also be desired to provide facilities whereby one or more lines can be displayed selectively, or to arrange that the order of the lines of display can be altered. This general flexibility is very useful and may be exploited by local console switching, or display subroutines which may form part of a test and maintenance procedure.

In general, for use in place of display lights for a processor, it seems convenient for an integrated circuit module for the converters to use relatively slow, cheap logic technology compatible with the signal from the type, e.g., emittercoupled logic (ECL), used in the processor.

The operation of a circuit of FIG. 1 results in an enabling signal being sequentially applied by the shift register to the AND gates. The same result can be obtained using a sequential state register, such as a counter operated at the first repetition rate, as by pulses from a clock, and a decoder having a plurality of outputs each for enabling a different AND gate. The decoder will operate to energise its outputs sequentially as the counter state changes. Enabling of the decoder at the second repetition rate completes the analogy of the operation. The decoding may be partially or fully incorporated in third and, if necessary, further inputs of the AND gates.

Each decoder may serve thirtytwo AND gates to make up the equivalent of a "line" arrangement G of FIG. 3. Such a decoder could operate off the five least significant stages of a single counter with more significant stages feeding logic for providing enabling signals to determine which of several sets of 32 AND gates is operable.

Particular applications are envisaged where sequential states are controlled partly by freerunning counter operation to cycle through several "lines" of monitored signals, and partly by setting a number either manually or by program control to select a particular block of lines for display.

Although the use of a television monitor has been indicated, display by panels of discrete neon or gallium phosphide lamps for displaying the serial output signal from embodiments of the invention. Serial to parallel conversion could be performed by circuits on the panels themselves.

I claim:

1. Signal monitoring and display apparatus including a plurality of element lines arranged in at least two groups and respectively carrying signals representative of the current states of elements to be monitored; means for producing first timing signals at a first frequency and second timing signals at a second frequency which is a submultiple of said first frequency; first parallel to serial converter means including a first parallel to serial converter module for each separate group of element lines, each said first module having a group of gating means respectively corresponding to and connected to a different one of the element lines, and scanning means responsive to the first signals to scan said group of gating means produce a first module output signal having a succession of elemental components respectively representing the states of the elements of the associated line group; and second parallel to serial converter means having a data output line and including at least one second parallel to serial converter module having a group of gating means respectively corresponding to and connected to receive a different one of the first module output signals and scanning means responsive to the second signals to scan the group of gating means to produce on said data output line a data output signal containing as serial components the elemental components arranged in order from each of the groups in succession and said timing signals; and a display device responsive to the data output signal of the second parallel to serial converter means data to provide a visual representation of the individual states of the elements.

2. Apparatus as claimed in claim 1 in which said first display converter modules are arranged in at least two groups, with the modules of each group being connected in tandem, the scanning means for the modules of each group being serially connected to scan the gating arrangements of the different modules of each group in ordered succession.

3. Apparatus as claimed in claim 1 in which the output signal from of the last of said first converter modules of each group is connected to a gating arrangement of the module of the second converter module, the scanning means of the module of the second converter module being so responsive to said second timing signals as to present as its output signals signals derived from its gating arrangements in succession on the data output line.

4. Apparatus as claimed in claim 3 in which the means for producing timing signals includes a pulse generator for producing a first train of pulses at said first frequency and at least one parallel to serial converter module, a plurality of gating arrangements each having input lines, and scanning means responsive to the first train of pulses to scan the gating arrangements in turn, selected ones only of the gating arrangements being enabled by their respective gating input lines, and in which scanning of the gating arrangements produces an output signal comprising a train of pulses at said second frequency.

* * * * *